US009083177B2

(12) United States Patent
Andersen et al.

(10) Patent No.: US 9,083,177 B2
(45) Date of Patent: Jul. 14, 2015

(54) FAULT PROTECTION SYSTEM FOR A POWER SYSTEM OF DYNAMICALLY POSITIONED VESSEL

(71) Applicant: Siemens Aktiengesellschaft, Munich (DE)

(72) Inventors: Rune B. Andersen, Oslo (NO); Svein Blystad, Sandefjord (NO); Inge Haukaas, Oslo (NO); Gunnar Koenig, Oslo (NO); Damir Radan, Sandnes (NO); Stig Olav Settemsdal, Trondheim (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 245 days.

(21) Appl. No.: 13/864,944

(22) Filed: Apr. 17, 2013

(65) Prior Publication Data
US 2013/0271879 A1 Oct. 17, 2013

(51) Int. Cl.
*H02H 7/06* (2006.01)
*H02H 7/26* (2006.01)
(Continued)

(52) U.S. Cl.
CPC ...... *H02H 7/06* (2013.01); *B63J 3/00* (2013.01); *H02H 7/261* (2013.01); *B63H 23/24* (2013.01); *B63H 25/42* (2013.01); *H02H 3/28* (2013.01); *H02H 3/335* (2013.01); *H02H 7/266* (2013.01)

(58) Field of Classification Search
CPC .......... H02H 7/26; H02H 7/261; H02H 3/28; H02H 3/338; H02H 7/06; B63H 23/24
USPC ............ 318/34, 41, 43, 49, 75, 95, 112, 434; 361/20, 21, 23, 30, 33, 62
See application file for complete search history.

(56) References Cited

U.S. PATENT DOCUMENTS 4,306,265 A * 12/1981 Kuntner et al. ............... 361/31
4,682,263 A *  7/1987 Gradnitzer et al. ........... 361/31
(Continued)

FOREIGN PATENT DOCUMENTS

DE    202007018606 U1    2/2009    ............ H02H 7/22
EP         2243700 A2   10/2010    ............ B63H 21/17
(Continued)

OTHER PUBLICATIONS

Japanese Office Action, Application No. 2013-086640, 5 pages, Mar. 31, 2014.
(Continued)

*Primary Examiner* — Bentsu Ro
*Assistant Examiner* — Thai Dinh
(74) *Attorney, Agent, or Firm* — Slayden Grubert Bread PLLC

(57) ABSTRACT

A fault protection system of a power system of a dynamically positioned vessel is provided. The power system has a power distribution bus having three or more bus subsections, electric connections including bus ties which connect the bus subsections in a ring configuration, and circuit breakers connected between the bus subsections. The fault protection system includes a generator circuit breaker for coupling a generator to a bus subsection, feeder circuit breaker(s) for coupling load(s) to the bus subsection, a first circuit breaker for connecting one end of the bus subsection to a bus tie that provides an electric connection to another bus subsection, the first circuit breaker being a bus tie breaker, a second circuit breaker for coupling another end of the bus subsection to a further bus subsection, protection relays for operating the circuit breakers, and communication links between protection relays that exchange information via said communication links.

15 Claims, 5 Drawing Sheets

(51) Int. Cl.
B63J 3/00 (2006.01)
*H02H 3/28* (2006.01)
*H02H 3/33* (2006.01)
*B63H 23/24* (2006.01)
*B63H 25/42* (2006.01)

(56) References Cited

U.S. PATENT DOCUMENTS

| | | | |
|---|---|---|---|
| 4,952,852 A * | 8/1990 | Bando et al. | 318/140 |
| 6,297,939 B1 * | 10/2001 | Bilac et al. | 361/64 |
| 6,914,762 B2 * | 7/2005 | Bo | 361/62 |
| 7,599,161 B2 | 10/2009 | Premerlani et al. | 361/62 |
| 8,385,035 B2 * | 2/2013 | Narel et al. | 361/62 |
| 8,400,740 B2 | 3/2013 | Schumacher et al. | 361/54 |
| 8,680,707 B2 | 3/2014 | Childs et al. | 307/9.1 |
| 8,964,337 B2 * | 2/2015 | Sharma et al. | 361/21 |
| 2008/0158753 A1 | 7/2008 | Premerlani et al. | 361/80 |
| 2013/0215543 A1 | 8/2013 | Hoeven | 361/63 |
| 2013/0271879 A1 | 10/2013 | Andersen et al. | 361/20 |

FOREIGN PATENT DOCUMENTS

| | | | |
|---|---|---|---|
| EP | 2262074 A1 | 12/2010 | H02H 11/00 |
| EP | 2442417 A1 | 4/2012 | B63B 39/08 |
| JP | 57088826 A | 6/1982 | H02H 7/26 |
| JP | 8021264 A | 1/1996 | F02C 9/28 |
| JP | 9233896 A | 9/1997 | H02P 9/04 |
| JP | 2001028848 A | 1/2001 | H02J 11/00 |
| JP | 2001346326 A | 12/2001 | H02H 3/28 |
| JP | 2007006673 A | 1/2007 | H02H 3/38 |
| JP | 2007318951 A | 12/2007 | H02H 3/00 |
| JP | 2008167647 A | 7/2008 | H02H 3/38 |
| JP | 2011135764 A | 7/2011 | B63H 21/17 |
| JP | 2011193586 A | 9/2011 | H02J 3/46 |
| JP | 2013223424 A | 10/2013 | H02H 3/28 |
| JP | 2013540416 A | 10/2013 | H02H 3/26 |
| WO | 98/48497 A1 | 10/1998 | H02H 7/26 |

OTHER PUBLICATIONS

Singapore Search Report and Written Opinion, Application No. 201302708, 10 pages, Mar. 11, 2014.

* cited by examiner

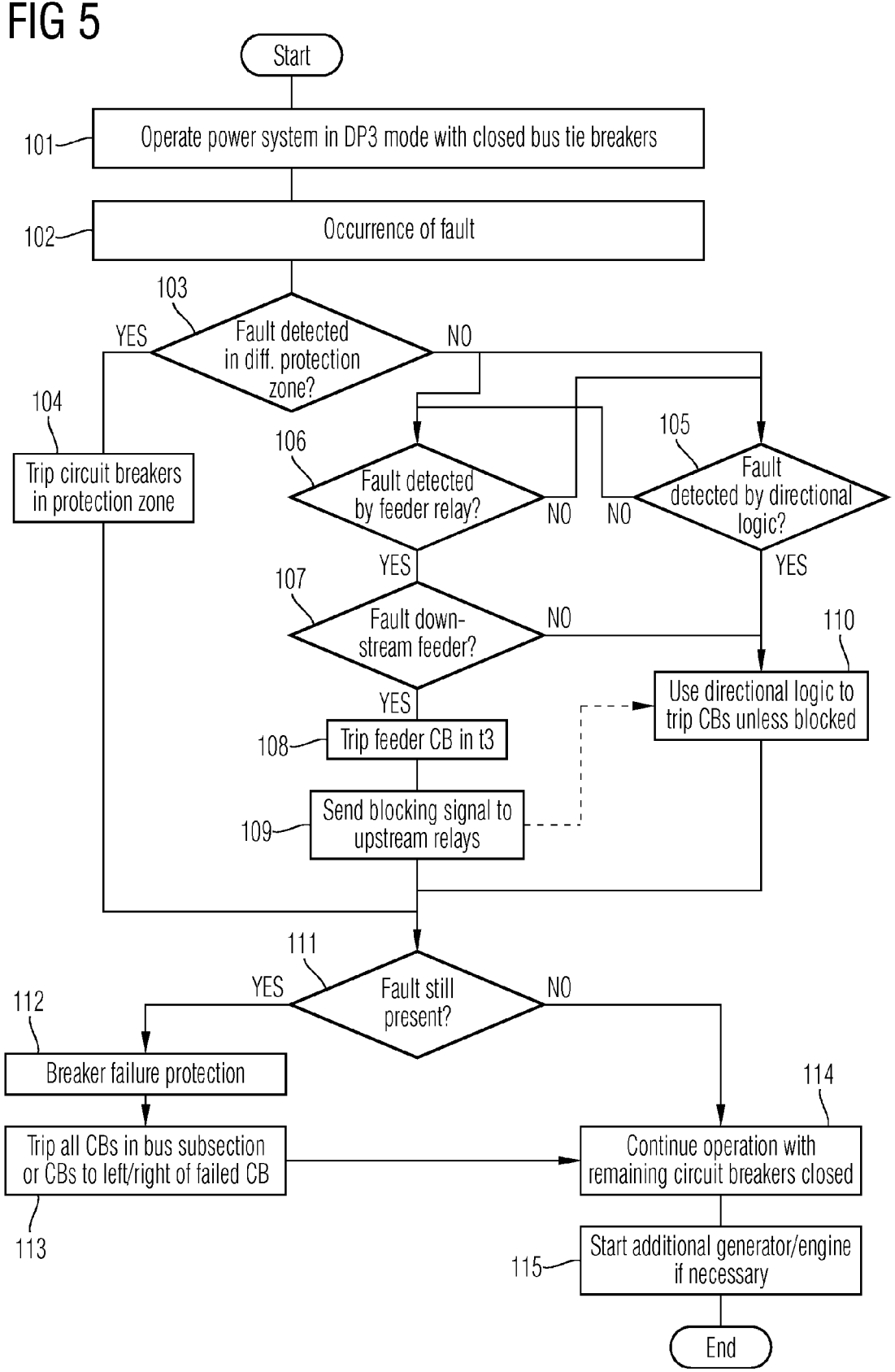

FAULT PROTECTION SYSTEM FOR A POWER SYSTEM OF DYNAMICALLY POSITIONED VESSEL

CROSS-REFERENCE TO RELATED APPLICATIONS

This application claims priority to EP Patent Application No. 12164471.0 filed Apr. 17, 2012. The contents of which is incorporated herein by reference in its entirety.

TECHNICAL FIELD

The disclosure relates to a fault protection system of a power system of a dynamically positioned vessel, to a power system of a dynamically positioned vessel and to a method of operating a fault protection system of such power system.

BACKGROUND

Floating vessels, such as semi submersibles, drill ships, floating production storage and offloading (FPSO) vessels or the like can be provided with dynamic positioning systems. Such dynamically positioned vessels can use electrically driven propellers, i.e. electric thrusters, to keep position during oil and gas drilling operations, station keeping, anchoring, port maneuvering and the like. For certain types of operations, in which an increased risk of oil pollution, loss of life, collisions or the like exists, it has to be ensured that the position of the vessel is kept for minimizing these risks. Integrity and failure safe operation of the power system which supplies electric power to the thrusters of the dynamically positioned vessel are thus of particular importance.

The vessels can be classified into different classes, such as DP2 (dynamic positioning 2), DP3 or the like. High risk operations such as drilling operations or the approach of other vessels may for example require a certain mode of operation for a particular vessel class. To ensure that a malfunction of a component does not lead to a complete blackout of the power system of the dynamically positioned vessel, the power system needs to be split into several sections, e.g. 2 to 4, in such high risk mode of operation. Each section of the power system is located in a separate engine room, the engine rooms being isolated with fire proof and water tight walls. During such high risk operations, the sections of the power system are electrically isolated, e.g. by opening connections provided by electric cables termed bus ties. One or more engines with connected generators have to be run per power system section in order to supply electric power to connected loads, e.g. to the electric motors of the thrusters. Consequently, in a system with only three sections, three, four or more engines will be running most of the time, the number increasing with the number of sections.

The engines will generally run at relatively low power output, wherein the specific fuel consumption of these engines in the low operating range is generally higher. Consequently, fuel consumption of such power system is high compared to an operational mode in which the sections of the power system can be electrically connected, so that for example only two generators need to be operated, each at a higher load.

Besides the increased fuel consumption and $CO_2$ emission, running several engines in parallel with reduced load can further result in soot accumulating in the combustion chambers, increased operating hours for the generator sets and thus higher costs of maintenance. Since the engines will run most of the time, the blackout risk is also increased.

Operating such system with interconnected power system sections, i.e. with connected bus ties, is generally not possible since a fault, such as a short circuit or generator failure, will generally result in a total blackout of the vessel's power system. Such blackout will result in a loss of position of the vessel, which can be detrimental; it can result in an oil spill or the loss of life. This is for example caused by a propagation of the fault within the power system, so that when bus ties are connected, a fault in one section of the power system will lead to the tripping of components, e.g. generators and thrusters, in other sections of the power system. This can result in the inoperability of most thrusters of the vessel, the vessel thus loosing maneuverability.

It is thus desirable to improve such power systems of dynamically positioned vessel, and to reduce or even eliminate fault propagation in such power systems. It is desirable that most parts of the power system remain operable upon occurrence of a fault. Also, it is desirable to achieve operation with reduced fuel consumption and higher efficiently of the engines powering the generators. It is also desirable to maintain such fuel efficient operation during high risk operations, without compromising the integrity and the safe operation of the power system.

SUMMARY

One embodiment provides a fault protection system of a power system of a dynamically positioned vessel, wherein the power system comprises a power distribution bus comprising three or more bus subsections, electric connections including bus ties which connect the bus subsections in a ring configuration and circuit breakers connected between the bus subsections to break the electric connections, wherein for at least one of said bus subsections, the fault protection system comprises: a generator circuit breaker for coupling a generator to the bus subsection, one or more feeder circuit breakers for coupling one or more loads to the bus subsection, a first circuit breaker via which a first end of the bus subsection is connected to a bus tie, said bus tie providing the electric connection to another bus subsection in said ring configuration, the first circuit breaker being a bus tie breaker, second circuit breaker for coupling a second end of the bus subsection to a further bus subsection in said ring configuration, protection relays coupled to the circuit breakers for operating the circuit breakers, and communication links between the protection relays, the protection relays being configured to exchange information via said communication links; wherein said protection relays are configured to provide at least: a generator protection zone including the generator circuit breaker and a generator, the protection relay coupled to the generator circuit breaker being configured to provide a differential protection for the generator, a bus tie protection zone including the bus tie breaker, the bus tie and a further bus tie breaker via which the bus tie is coupled to the other bus subsection, wherein protection relays coupled to the bus tie breakers are configured to provide differential protection for the bus tie, and a bus subsection protection zone including the bus subsection and the circuit breakers coupled to the bus subsection, the protection relays coupled to these circuit breakers being configured to provide a differential protection for the bus subsection.

In a further embodiment, the electric connection at the second end of the bus subsection is provided by a bus coupler, the second circuit breaker being a bus coupler circuit breaker, wherein said protection relays are further configured to provide a bus coupler protection zone including said bus coupler and said bus coupler circuit breaker, the protection relay coupled to the bus coupler circuit breaker being configured to provide a differential protection for the bus coupler.

In a further embodiment, for providing said differential protection, the protection relays coupled to the circuit breakers in the respective protection zone are configured to determine the currents entering and leaving the protection zone and to determine whether a fault exists in the protection zone based on the determined currents and/or on information received via a respective communication link.

In a further embodiment, at least the protection relays coupled to the first circuit breaker and the second circuit breaker are configured to provide a directional protection for at least the bus tie and/or the bus subsection.

In a further embodiment, the protection relays coupled to the generator circuit breaker, the first circuit breaker and the second circuit breaker are configured to trip these circuit breakers if: the current directions at the measuring points of these relays are pointing to the bus subsection, or the first circuit breaker or the second circuit breaker are open and the current direction at the respective other end of the bus subsection is pointing towards the bus subsection, or the current and voltage at the first circuit breaker or the second circuit breaker are below predetermined thresholds and the current direction at the respective other end of the bus subsection is pointing towards the bus subsection.

In a further embodiment, the protection relays coupled to the one or more feeder circuit breakers provide a directional over-current protection, wherein, if the protection relay detects a current above a threshold in the direction of the load, a blocking signal is provided to protection relays coupled to upstream circuit breakers to block these protection relays from tripping these circuit breakers and the respective feeder circuit breaker is tripped within a predetermined tripping time t3 after detection of a fault.

In a further embodiment, the protection relays are configured to trip the circuit breakers coupled thereto within a first tripping time t1 after detection of a fault using said differential protection, and to trip the circuit breakers coupled thereto within a second tripping time t2 after detection of a fault using said directional protection, wherein the first tripping time t1 is smaller than the second tripping time t2.

In a further embodiment, the protection relays coupled to the one or more feeder circuit breakers provide a over-current protection, wherein the feeder circuit breaker is tripped if the respective protection relay detects a current in the feeder that is above a predetermined threshold.

In a further embodiment, the protection relays coupled to the one or more feeder circuit breakers provide a directional over-current protection, wherein, if the protection relay detects a current above the threshold in the direction of the load, the respective feeder circuit breaker is tripped within a predetermined tripping time t3 after the detection of a fault, and wherein, if the protection relay detects a current above a further threshold in the reverse direction, the respective feeder circuit breaker is tripped within a predetermined tripping time t4 which is larger than the tripping time t3.

In a further embodiment, the fault protection system further comprises a breaker failure detection system which is configured to detect if a circuit breaker failed to break the electric connection after the relay coupled to the circuit breaker issued a trip command due to a fault, and, in case of detecting such failure, to trip one or more other circuit breakers to clear the fault.

In a further embodiment, the breaker failure detection system is adapted to detect the failure of the circuit breaker by detecting a flow of current through the circuit breaker or by detecting the status of the circuit breaker.

In a further embodiment, the breaker failure detection system is adapted to clear the fault: if the first circuit breaker failed, by tripping a bus tie breaker on the other end of the bus tie, if a bus coupler circuit breaker failed, by tripping a circuit breaker at the other end of each of the bus subsections connected to the bus coupler, and if the generator circuit breaker or a load circuit breaker failed, by tripping all other circuit breakers connected to the same bus subsection.

Another embodiment provides a power system of a dynamically positioned vessel comprising a fault protection system as disclosed above.

Another embodiment provides a method of operating a fault protection system of a power system of a dynamically positioned vessel, wherein the fault protection system is configured as disclosed above, the method comprising the steps of: detecting the occurrence of a fault in one of said protection zones by means of the protection relays coupled to the circuit breakers comprised in the respective protection zone, and tripping the circuit breakers in the protection zone in which the fault occurred.

In a further embodiment, the method further comprises the steps of: if the fault was not cleared after a predetermined tripping time t1, using a directional logic provided in the protection relays to detect the presence of a fault in one of the electrical connections or in the bus subsection and tripping the circuit breakers connected to said electrical connection or the bus subsection, respectively.

BRIEF DESCRIPTION OF THE DRAWINGS

Exemplary embodiments will be explained in more detail below on the basis of the schematic drawings, wherein:

FIG. 5 is a flow diagram illustrating a method according to an example embodiment.

DETAILED DESCRIPTION

Figure 1:
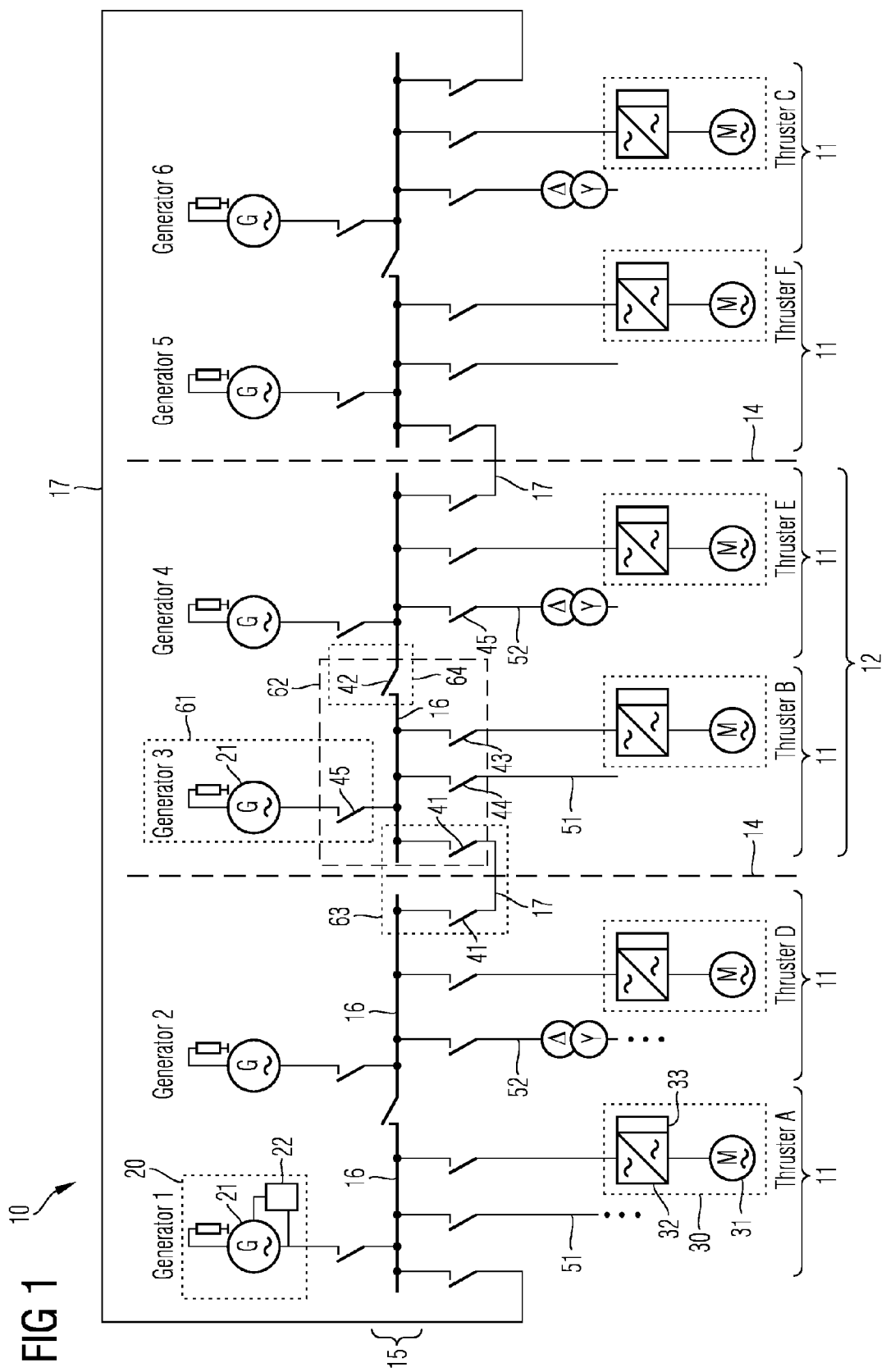
FIG. 1 is a schematic drawing of a power system of a dynamically positioned vessel including a fault protection system according to an example embodiment.

Embodiments of the present disclosure are provided for improving the fault tolerance and integrity of power systems of dynamically positioned vessels, e.g., to reduce or prevent fault propagation in such systems.

One embodiment provides a fault protection system of a power system of a dynamically positioned vessel, wherein the power system comprises a power distribution bus comprising three or more bus subsections, electric connections including bus ties which connect the bus subsections in a ring configuration and circuit breakers connected between the bus subsections to break the electric connections. For at least one of said bus subsections, the fault protection system comprises a generator circuit breaker for coupling a generator to the bus subsection, one or more feeder circuit breakers for coupling one or more loads to the bus subsection, a first circuit breaker via which a first end of the bus subsection is connected to a bus tie, said bus tie providing the electric connection to another bus subsection in said ring configuration, the first circuit breaker being a bus tie breaker, a second circuit breaker for coupling a second end (i.e. the other end) of the bus subsection to a further bus subsection in said ring configuration, protection relays coupled to the circuit breakers for operating the circuit breakers, and communication links between the protection relays, the protection relays being configured to exchange information via said communication links. The protection relays are configured to provide at least a generator protection zone including the generator circuit breaker and a generator, the protection relay coupled to the generator circuit breaker being configured to provide a differential protection for the generator, a bus tie protection zone including the bus tie breaker, the bus tie and a further bus tie breaker via which the bus tie is coupled to the other bus subsection, wherein protection relays coupled to the bus tie breakers are configured to provide differential protection for the bus tie, and a bus subsection protection zone including the bus subsection and the circuit breakers coupled to the bus subsection, the protection relays coupled to these circuit breakers being configured to provide a differential protection for the bus subsection.

Accordingly, if by means of the differential protection provided for the different zones, a fault is detected, the protection relays can trigger the circuit breakers (CBs) within the respective zone and can thus isolate and clear the fault fast and efficiently. Since the circuit breaker(s) within the zone is/are triggered, other zones can largely remain unaffected and can continue to operate. The fault location may thus be detected automatically, and the tripping of the whole subsection of the power system can be prevented. As an example, if the generator protection zone is tripped, a load in form of a thruster coupled to the same bus subsection can remain operational and can be supplied with electric power from a neighbouring bus subsection, e.g. via a bus tie.

In an embodiment, each circuit breaker is coupled to and associated with a protection relay which is configured to operate the respective circuit breaker.

In an embodiment, at least one of said loads is a thruster drive, the respective feeder circuit breaker being a thruster drive circuit breaker. The thruster drive may be connected to the bus subsection via a thruster drive transformer, the thruster drive circuit breaker being coupled between the thruster drive transformer and the bus subsection. Each bus subsection may be coupled to a generator and to a thruster drive, the thruster drive thus being operable even if the bus subsection becomes separated from remaining bus subsections in the ring configuration.

In an embodiment, the electric connection at the second end of the bus subsection is provided by a bus coupler, the second circuit breaker being a bus coupler circuit breaker. The protection relays are further configured to provide a bus coupler protection zone including the bus coupler and the bus coupler circuit breaker, the protection relay coupled to the bus coupler circuit breaker being configured to provide a differential protection for the bus coupler. Two neighbouring bus subsections may for example be connected by means of the bus coupler, and they may form a bus section. A bus section may be formed by 2, 3 or more bus subsections. The power system may comprises plural bus sections, e.g. 3, 4, 5 or more, which may be connected in the ring configuration by the bus ties. Bus sections may be provided in different rooms of the vessel and separated by fire proof walls. Accordingly, the power system can remain operational even if a blackout of a complete bus section should occur, for example due to a fire.

In an embodiment, for providing the differential protection, the protection relays coupled to the circuit breakers in the respective protection zone can be configured to determine the magnitude of the currents entering and leaving the protection zone and to determine whether a fault exists in the protection zone based on the determined currents and/or on information received via a respective communication link. If no fault exists in the protection zone, the currents entering and leaving the protection zone should be equal. Each protection relay within the protection zone may be configured to measure the current through the associated circuit breaker. Vie the communication links, information on the currents can be exchanged, and the existence of a fault in the protection zone can be determined fast and efficiently. As an example, a relay may be provided for each protection zone which comprises a programmable logic that receives the information from other relays in the protection zone (if such are present), and evaluates whether a fault condition exists. In such case, it may then send a trigger signal to the other protection relays within the zone for triggering the associated circuit breakers. Current measurement may be performed by the protection relays by means of current transformers (CTs).

In an embodiment, at least the protection relays coupled to the first circuit breaker and the second circuit breaker are configured to provide a directional protection for at least the bus tie and/or the bus subsection. Accordingly, a back-up can be provided in case that the differential protection fails or does not trigger. By means of the directional protection, the particular configuration of the power system and the common operational modes can be taken into account, and the tripping can be restricted to the circuit breakers that are necessary to clear the fault, i.e. a high degree of selectivity becomes possible. Accordingly, other components of the power system not affected by a fault can remain operational.

The corresponding relays may for example comprise a directional logic, which is capable of determining the direction of current flow, e.g. through the associated circuit breaker. Voltages at each side of the circuit breaker may be considered for this purpose, voltage differences may for example be measured for determining the current direction.

The protection relays providing said directional protection may be configured to detect the direction of current through the associated circuit breaker and to trip the associated circuit breaker in dependence on current direction, circuit breaker status of own/other circuit breakers and/or energy flow. The respective relays may be configured to trip if the current (through the associated circuit breaker) is above a threshold, and the time delay for tripping the circuit breaker may depend on the current direction. The respective protection relays may be configured to exchange information relating to the current direction and to the status of the associated circuit breaker via the communication links.

The relays coupled to the generator circuit breaker, the first circuit breaker and the second circuit breaker may for example be configured to trip these circuit breakers if a) the current directions at the measuring points of these relays are pointing to the bus subsection, or b) the first circuit breaker or the second circuit breaker are open and the current direction at the respective other end of the bus subsection is pointing towards the bus subsection, or c) the current and voltage at the first circuit breaker or the second circuit breaker are below predetermined thresholds, i.e. the respective circuit breaker is de-energized, and the current direction at the respective other end of the bus subsection is pointing towards the bus subsection. As mentioned above, the current detected by the respective protection relay also needs to be above the threshold for tripping.

As an example, the relay coupled to the second circuit breaker, e.g. the bus coupler circuit breaker, may be a master relay and may comprise a trip logic for each of the two bus subsections connected via this second circuit breaker. Depending on the information provided by the other relays of the respective bus subsection, the master relay can the issue a trip command for tripping the circuit breakers of one or the other bus subsection.

The protection relay (master relay) coupled to the second circuit breaker may for example be in communication with the protection relay coupled to the first circuit breaker (bus tie breaker of the first bus subsection) and with a corresponding protection relay coupled to a bus tie breaker at the other end of the second bus subsection, wherein said master relay is configured such that if the directional trip logic for the first bus subsection detects a fault, it issues a signal to trip the second circuit breaker, the first circuit breaker and the generator circuit breaker.

In an embodiment, the protection relays coupled to the one or more feeder circuit breakers provide a directional over-current protection, wherein, if such protection relay detects a current above a threshold in the direction of the load, a blocking signal is provided by said protection relay to a protection relay coupled to an upstream circuit breakers, in particular to the a protection relay coupled to the first circuit breaker, the second circuit breaker and/or the generator circuit breaker, to block these protection relays from tripping these circuit breakers, and the respective feeder circuit breaker is tripped within a predetermined tripping time t3 after detection of a fault. The tripping of circuit breakers can thus be kept to a minimum and the power system can stay operational with a maximum of components. Such blocking signal may for example be send by the protection relay of the feeder circuit breaker to the upstream protection relays via the communication As an example, the feeder circuit breaker (CB) protection relay may send the blocking signal to a bus coupler circuit breaker, which may be a master circuit breaker to prevent the tripping of the whole bus subsection, or to tech of the relays coupled to the upstream circuit breakers of the bus subsection. Upstream means in the direction towards a current source, i.e. towards a generator or another bus subsection. In particular, these may be the CBs coupled to the bus subsection other than the feeder CBs.

The upstream protection relay(s) may be configured to trip their associated circuit breakers after a predetermined amount of time even if receiving the blocking signal, so that if the feeder CB is not able to clear the fault, the upstream circuit breakers are tripped by means of the directional protection. This delay is of course longer than t3 within which the feeder CB is tripped.

In some embodiments, t3 may be equal or smaller than 200 ms. In some configurations, the load may comprise a low voltage (LV) distribution system. The protection relay coupled to the feeder circuit breaker for the LV distribution system can be configured to trip this CB within a longer time period, e.g. with t3<500 ms, e.g. 300 ms<t3<500 ms. This way, downstream consumers may have enough time to trip and to thereby clear the fault, so that the remaining LV distribution system can stay connected to the bus subsection. The loss of essential consumers may thus be prevented.

In an embodiment, the protection relays are configured to trip the circuit breakers coupled thereto within a first tripping time t1 after detection of a fault using said differential protection, and to trip the circuit breakers coupled thereto within a second tripping time t2 after detection of a fault using said directional protection, wherein the first tripping time t1 is smaller than the second tripping time t2. The directional protection may thus be provided as a back-up for the bus ties, the bus coupler and the bus subsection. t1 and t2 may for example lie within a range of about 20 ms to about 200 ms. The time t1 may be shorter than 100 ms, and the time t2 may be shorter than 150 ms.

In an embodiment, the protection relays coupled to the one or more feeder circuit breakers may provide over-current protection, wherein the feeder circuit breaker is tripped if the respective protection relay detects a current in the feeder that is above a predetermined threshold. Accordingly, if there is a fault downstream at a load, the fault can be cleared fast and efficiently without tripping further components coupled to the bus subsection.

The protection relays coupled to the one or more feeder circuit breakers may provide a directional over-current protection. If such protection relay detects a current above the threshold in the direction of the load, the respective feeder circuit breaker is tripped within a predetermined tripping time t3 after the detection of a fault, and if the protection relay detects a current above a further threshold in the reverse direction, i.e. in the direction towards the bus subsection, the respective feeder circuit breaker is tripped within a predetermined tripping time t4 which is larger than the tripping time t3. Consequently, in the second case, the system allows the fault to be cleared at another position without tripping the load. As an example, a fault in a generator may cause a reverse current in the load feeder. The delayed tripping of the feeder CB allows the fault to be cleared by tripping the generator without tripping the load. Accordingly, the load can be supplied with electric power from another generator via another bus subsection and thus stays operational. This is particularly beneficial for loads in the form of thruster drives, as the thrusters can continue to operate, and the vessel can keep its position.

The time t3 may be shorter than 200 ms, e.g., shorter than 150 ms. The time t4 for tripping upon a reverse current flow may be between about 150 ms and about 400 ms, e.g., between about 250 ms and 350 ms.

The protection relays may be configured to trip the differential protection within t1, the directional protection for the bus subsection in t2>t1 (with blocking from the feeder CB protection relays), the over-current protection for loads (feeder CBs) in t3>t1, the over-current protection for loads with current in reverse direction with t4>t3 and the directional protection for the bus ties within a time larger than t1, e.g. similar to t4.

In an embodiment, the fault protection system may further comprise a breaker failure detection system which is configured to detect if a circuit breaker failed to break the electric connection after the protection relay coupled to the circuit breaker issued a trip command due to a fault, and, in case of detecting such failure, to trip one or more other circuit breakers to clear the fault. The functionality of the breaker failure detection system may be termed 'breaker failure protection'. The fault can thus be cleared even if a CB failure is present, and a complete blackout of the power system can be prevented.

The breaker failure detection system may be adapted to detect the failure of the circuit breaker by detecting a flow of current through the circuit breaker or by detecting the status of the circuit breaker. The status of the circuit breaker means that it is detected whether the CB is opened or closed, e.g. by detecting the position of the element opening or closing the circuit. The information that a trip command was issued for the circuit breaker can be obtained by communication from the associated protection relay, or the breaker failure protection functionality may be directly integrated into the protection relay associated with the respective CB.

The breaker failure detection system may for example be adapted to clear the fault in the following situations: if the first circuit breaker failed, by tripping a bus tie breaker on the other end of the bus tie; if a bus coupler circuit breaker failed, by tripping a circuit breaker at the other end of each of the bus subsections connected to the bus coupler; if the generator circuit breaker or a load circuit breaker failed, by tripping all other circuit breakers connected to the same bus subsection. The tripping time for the breaker failure detection can be adjusted to be longer than t1 and t2, it may be adjusted to a time longer than the respective maximum circuit breaker operating time plus the dropout time of e.g. the current detection element for the CB. Accordingly, it can be ensured that the CB failure protection is not accidentally triggered.

In an embodiment, the fault protection system is for each bus subsection of the power system configured according to any of the above described embodiments.

Other embodiments provide a power system of a dynamically positioned vessel. The power system comprises a fault protection system in any of the above outlined configurations. The power system can be configured in accordance with any of the embodiments described above and further below. Such power system provides an enhanced integrity against faults. In particular, a single fault does not lead to a complete blackout of the power system, and components not affected by the fault will stay connected to the power system. Such power system may thus be operated in a closed ring configuration, i.e. with closed bus tie breakers, even during high risk operations, e.g. in DP2 or DP3 modes of operation.

A further embodiment provides a method of operating a fault protection system of a power system of a dynamically positioned vessel. The fault protection system is configured in accordance with any of the above described configurations. The method comprises the steps of detecting the occurrence of a fault in one of the protection zones by means of the protection relays coupled to the circuit breakers comprised in the respective protection zone, and of tripping the circuit breakers in the protection zone in which the fault occurred. With the method, advantages similar to the ones outlined further above with respect to the fault protection system may be achieved.

In an embodiment, the method further comprises the steps of: if the fault was not cleared after a predetermined tripping time t1, using a directional logic provided in the protection relays to detect the presence of a fault in one of the electrical connections or in the bus subsection; and tripping the circuit breakers connected to said electrical connection or the bus subsection, respectively. Accordingly, even if a fault should not be detected or cleared by the zone differential protection, the directional protection serves as a back-up and may clear the fault.

In other embodiments, the method may comprise further steps, such as detecting magnitude and direction of a current in a feeder coupled to the bus subsections and tripping the corresponding feeder CB within a time t3 if the current magnitude is above a threshold and the current is in a downstream direction. It may further comprise the step of blocking the tripping of upstream CDs in such case.

It may further comprise the step of tripping a feeder CB within a time t4 if the current through the feeder CB is in a reverse (upstream) direction, with t4 being larger than t3.

The method may further comprise detecting a failure of a circuit breaker and upon detection of such failure, if the failed circuit breaker is a bus tie or bus coupler circuit breaker, tripping a neighbouring bus tie or bus coupler circuit breaker, and if the failed circuit breaker is the generator or feeder circuit breaker, tripping all circuit breakers connected to the bus subsection. The fault can thus be efficiently isolated even if a CB fails.

Embodiments of the method may be carried out on the fault protection system or the power system in any of the configurations outlined above. Furthermore, any method steps described further above with respect to the fault protection system or the power system of the dynamically positioned vessel may be part of embodiments of the method.

In the following, example embodiments are be described in detail with reference to the accompanying drawings. It is to be understood that the following description of the embodiments is given only for the purpose of illustration and is not to be taken in a limiting sense.

It should be noted that the drawings are to be regarded as being schematic representations only, and elements in the drawings are not necessarily to scale with each other. Rather, the representation of the various elements is chosen such that their function and general purpose become apparent to a person skilled in the art. It is also to be understood that the coupling of physical or functional units as shown in the drawings and described hereinafter does not necessarily need to be a direct connection of coupling, but may also be an indirect connectional or coupling, i.e. a connection or a coupling with one or more additional intervening elements, such as fuses, circuit breakers, transformers or the like. A skilled person will further appreciate that the physical or functional units illustrated and described herein with respect to the different embodiments do not necessarily need to be implemented as physically separate units. One or more physical or functional blocks or units may be implemented in a common circuit, chip, circuit element or unit, while other physical or functional blocks or units shown may be implemented in separate circuits, chips, circuit element or units.

FIG. 1 shows a power system 10 of a dynamically positioned vessel in accordance with an example embodiment. In the example of FIG. 1, the power system 10 is split into three power system sections 12, wherein the engines of the different power system sections are arranged in different engine rooms of the dynamically positioned vessel. The engine rooms are separated by fire proof and water tight walls 14.

The power system 10 comprises power sources 20 each comprising a generator 21 and loads 30, 51, 52 coupled to the same power distribution bus 15. The loads comprise the thruster drives 30, each of which includes a variable frequency drive 32 for converting the frequency of the supplied AC voltage to a frequency with which the drive is to be operated, and an electric motor 31 which rotates the propeller of the thruster. Further loads which may for example include drilling drives are connected by the electric connection 51 to the power distribution bus 15. Further, a low voltage power distribution system supplying smaller loads is connected via the electric connection 52 to the power distribution bus 15.

Each power system section 12 comprises a section of the power distribution bus 15. The bus sections are connected via bus ties 17. In the example of FIG. 1, the power distribution bus 15 comprises three sections which are separated by the fire and water tight walls 14. In other configurations, further sections, e.g. four or even more sections maybe provided, in accordance with the sectioning of the power system. The bus sections are connected in a ring configuration via the bus ties 17. This is in FIG. 1 illustrated by the upper bus tie 17 which connects the left hand end of the power distribution bus 15 to the right hand end of the power distribution bus 15. Bus tie circuit breakers 41, short bus tie breakers, are provided at each end of the bus tie cable. It is thus possible to electrically separate the bus sections of the power distribution bus 15. If a fault occurs in one section of the power system 10, the fault can accordingly not propagate to other sections of the power system 10. In conventional systems, the bus tie breakers 41 remain open during high risks operations.

It thus becomes immediately clear that in each section 12 of the power system 10, at least one generator 21 needs to be running. Each generator will thus run at relatively low load, leading to an inefficient operation of the power sources 20 and thus to an increased fuel consumption.

In the embodiment of FIG. 1, the bus sections are furthermore separable into bus subsections 16 by means of bus coupler circuit breakers 42. In the example of FIG. 1 the power system 10 can thus be separated into 6 power system subsections 11. If a fault occurs in a particular power system subsection 11, it becomes possible to electrically isolate this power system subsection from the remaining power system 10. Accordingly, only one thruster drive 30 is lost in such case, whereas in conventional systems, at least two thruster drives 30 are lost when a power system section 12 becomes inoperable due to a fault.

High risk operations, for example in DP2 or DP3 class mode of operation, require a particular high integrity and operational safety of the power system 10, so that under all circumstances, loss of position of the vessel is prevented. This means that no single fault should lead to a complete blackout of the power system 10, as a consequence of which the thruster drives would become inoperable and the vessel would lose its position. For this purpose, in conventional systems, the power systems sections 12 are completely electrically isolated, so that if the power system in one section fails, the others remain operable, thus ensuring that the vessel keeps its position with the remaining thrusters.

In contrast to conventional systems, the power system 10 according to the present embodiment is configured to keep the bus tie breakers 41 closed during high risk operations. Also, the bus coupler circuit breakers 42 are closed. The power system 10 comprises a fault protection system according to an example embodiment, by means of which it is ensured that the high integrity and operational safety of power system 10 required for high risk operations is achieved.

The purpose of the fault protection system of the present embodiment is a fast and efficient isolation of the fault in order to prevent the fault from propagating through the power system 10 and from affecting any other components thereof. In the following, the description will be given for a subsection 11 of the power system 10. It should be clear that the fault protection system can be configured correspondingly for the remaining power system subsections. Also, the power system of FIG. 1 has three sections, each being separable into two subsections via the bus coupler circuit breakers 42. In other embodiments, the power system 10 may have a different number of sections or of subsections per section. Also, the power system may comprise only subsections connected into a ring via the bus ties 17, i.e. without any further separation within the same section (in other words, only one subsection per section).

In FIG. 1, the fault protection system comprises a generator protection zone 61 which includes the generator 21 and the generator circuit breaker 45. It further comprises a bus tie protection zone 63 which includes a first circuit breaker 41 (bus tie breaker) connected to a first end of the bus subsection 16 and further to the bus tie 17. The other end of bus tie 17 is connected via a further bus tie breaker 41 to the bus subsection 16 of the adjacent power system section. The further bus tie breaker 41 and the bus tie 17 are also included in the bus tie protection zone 63.

The fault protection system further includes the bus subsection protection zone 62 which comprises the bus subsection 16, the first circuit breaker 41, a second circuit breaker 42 coupled to the other, second end of the bus subsection 16, the generator circuit breaker 45 and one or more feeder circuit breakers coupled to the bus subsection 16, which are in the present example the thruster drive circuit breaker 43 and a drilling drive circuit breaker 44. The second circuit breaker 42 can be a bus coupler circuit breaker (as in the present example) if the bus subsection 16 is coupled via a bus coupler to a neighboring bus subsection, or it may be a bus tie breaker, if the bus subsection 16 is coupled via a bus tie to a neighboring bus subsection (e.g. when no subdivision within power system sections exists).

The fault protection system can furthermore include a bus coupler protection zone 64 which includes the bus coupler (not explicitly highlighted in FIG. 1) and the bus coupler circuit breaker 42.

The fault protection system is configured to provide a differential protection for each of the protection zones. The differential protection may be configured such that the currents on both sides of the protected component are compared, i.e. the currents entering or leaving the protection zone. The implementation can use one or more protection relays which measure the current in the respective electric connections, e.g. by using a current transformer (CT). In the simplest configuration, a current relay may for example be connected in parallel with the secondary windings of two CTs located on either side of the component, e.g. before and after a generator winding. If the currents on both sides of the protected component are equal, so are the currents through the secondaries and there will accordingly be no current through the current relay. CT winding ratios can be used to balance out differences in the expected currents, e.g. when a transformer is located within the protected zone.

Note that in FIG. 1, only some of similar components are provided with reference numerals, so as to maintain a more clear and comprehensive presentation. Yet it should be clear that the descriptions given for a particular component do also apply to similar components of the same type.

Figure 2:
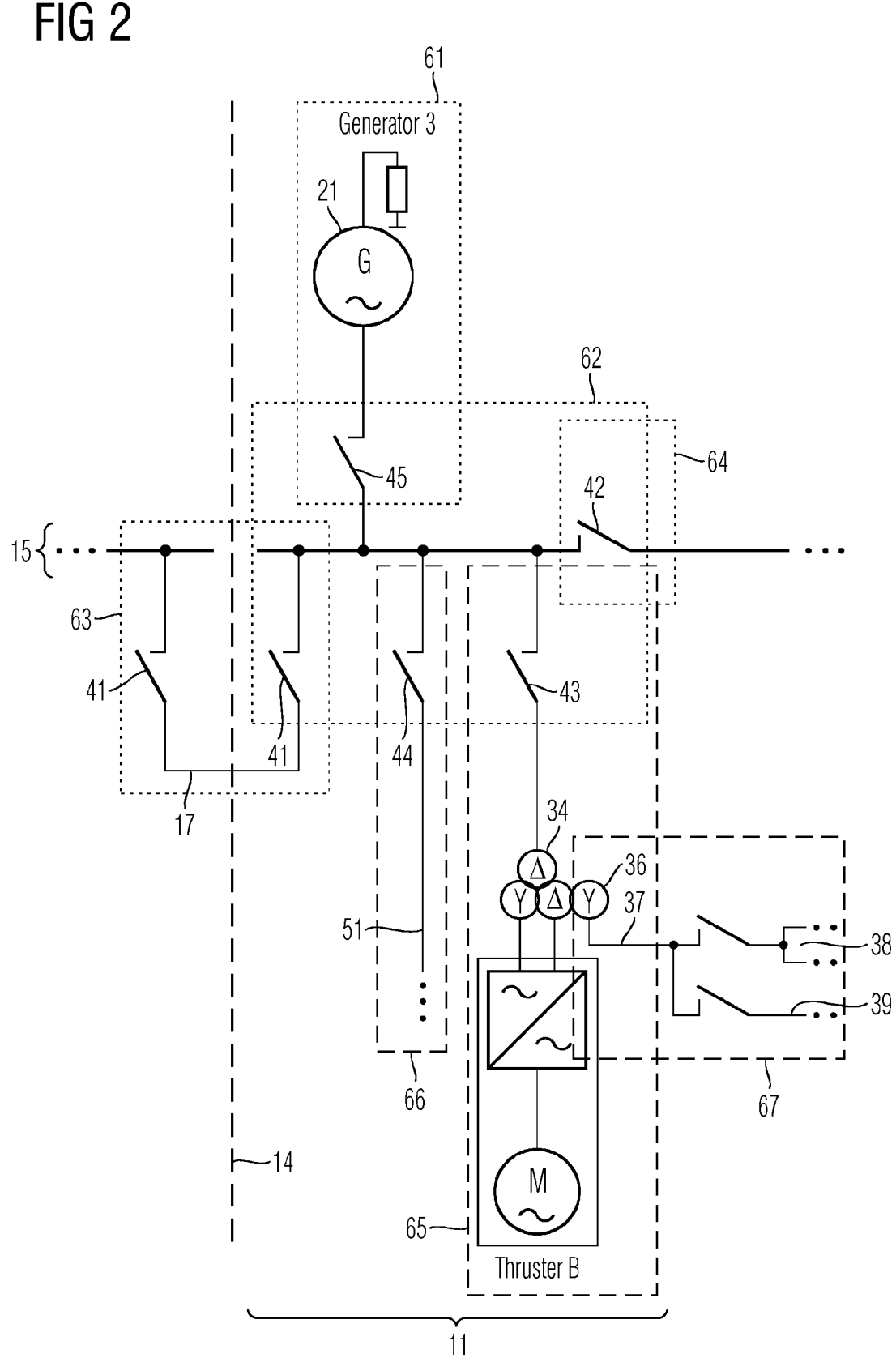
FIG. 2 is a schematic diagram showing the protection zones of the fault protection system and the power system of FIG. 1 in more detail.

The protection zones of FIG. 1 are shown in FIG. 2 in more detail. The fault protection system may for example include one protection relay for the generator protection zone 61 which can trip the circuit breaker 45. CTs of the protection relay may measure the currents on both sides of the three generator windings, and the relay can trigger the generator CB 45 if a current difference is detected.

Similarly, a protection relay for the bus tie protection zone 63 can measure the currents on both sides of the bus tie cable 17. If a difference in currents is detected, e.g. due to mechanical damage to the bus tie cable, the protection relay can trip one or both of the circuit breakers 41 in the protection zone 63. Also, a separate protection relays can be provided for each circuit breaker.

In the bus subsection protection zone 62, all currents entering and leaving the protection zone are monitored by the respective protection relays. These include currents through the bus tie 17 and the bus coupler, current provided by the generator 21 and currents to the loads via the feeder connections. Since several protection relays may be involved in the differential protection of such protection zone, the relays are configured to communicate with each other. Communication can occur via serial communication, it may in particular occur using IEC 61850 communication. One relay may act as a master relay and may comprise the logic for determining the occurrence of a fault, i.e. it may determine the occurrence of a current imbalance. It may send a trip signal to the other relays of the protection zone to trip the associated circuit breakers.

The differential protection for the bus coupler protection zone 64 operates correspondingly.

A fault occurring at the bus tie 17, the bus subsection 16 or the bus coupler which would otherwise not lead to the triggering of conventional over-current protection at the generator or at the loads can thus be identified and cleared fast and efficiently by opening all circuit breakers within the protected zone. Other areas of the power system 10 remain connected and operational.

For the loads, e.g. the thruster drive 30, a drilling drive 51, a low voltage (LV) power distribution system 52 or the like, feeder circuit breakers 43, 44 are provided. Respective protection zones include the thruster protection zone 65 including the thruster transformer 34, thruster drive 30 and the thruster circuit breaker 43, the drilling feeder protection zone 66 including the feeder 51 for a respective drilling drive and the drilling CB 44, a corresponding LV distribution feeder protection zone (not shown) including the feeder 52 for the LV distribution system and the distribution transformer (see FIG. 1), and the auxiliary loads protection zone 67 including the feeder(s) 38, 39 for e.g. thruster utilities, engine utilities for the engine driving the generator 21 or the like. These may be powered from a $4^{th}$ winding 36 (i.e. from a third secondary winding, as illustrated) of the thruster transformer 34. This way, space and weight savings can be achieved, as the utilities do not require an additional transformer. Also, since they can be powered from the generator of the same power system subsection 11, the power system subsection 11 can operate in isolation.

The before mentioned protection zones 65-67 provide short circuit and over current protection, using e.g. definite time over-current curves. The associated protection relay will trigger the respective circuit breaker upon detection of such over-current condition, as a result of which the load is disconnected from the remaining power system 10. Such protection is sufficient for the loads since a short circuit downstream of the respective CB will generally lead to an excessive current through the CB, which is detected by the protection relay.

The differential protection for zones 61-64 can respond relatively fast, e.g. within less than 100 ms. Also, the over-current protection for zones 65-67 can respond fast, e.g. within 140 ms. For some loads, the tripping of the CB may be delayed for allowing a downstream load which may have caused the fault to trip. Such delay may be used for the LV protection system. Since it is coupled to the respective bus subsection via a transformer, a short circuit downstream the LV distribution system affects directly the transformer secondary, but not so serious for the voltage stability on the distribution bus as a fault on the primary side of the transformer. The same is true for the auxiliary loads protection zone 67, a fault in which only directly affects the secondary winding 36. In both cases, plural smaller loads are connected downstream, so that by tripping the respective circuit breaker, essential loads may become inoperable, such as a generator or thruster lube oil pump or the like. By configuring the fault protection system to trip these CBs with a delay, e.g. to trip within 500 ms, or 450 ms, the component in which the fault occurred may have enough time to trip, thus clearing the fault without having to disconnect the whole LV distribution system or the respective utilities switchboard.

As a backup, for example if the primary differential protection fails or does not trip the CBs, the fault protection system can include a directional protection. The directional protection can be provided for the bus subsection, in particular the respective bus bars, for the bus ties and the bus coupler.

For the purpose of directional protection, the respective protection relays can comprise a directional logic which determines the existence of a fault condition and in response issues a trip command for the associated circuit breakers. The protection relay can measure for this purpose the direction and magnitude of the current, e.g. by measuring voltages at both sides of the associated circuit breaker.

The relays may operate in a Master-Slave configuration, in which the Master relay receives information from the other relays and, after determining a fault condition, issues the trip command to the other relays. Information that may be send via the communication between relays, e.g. IEC 61850 communication, include current direction, status of the associated circuit breaker, and energy flow, i.e. whether the associated CB is energized or not.

Figure 3:
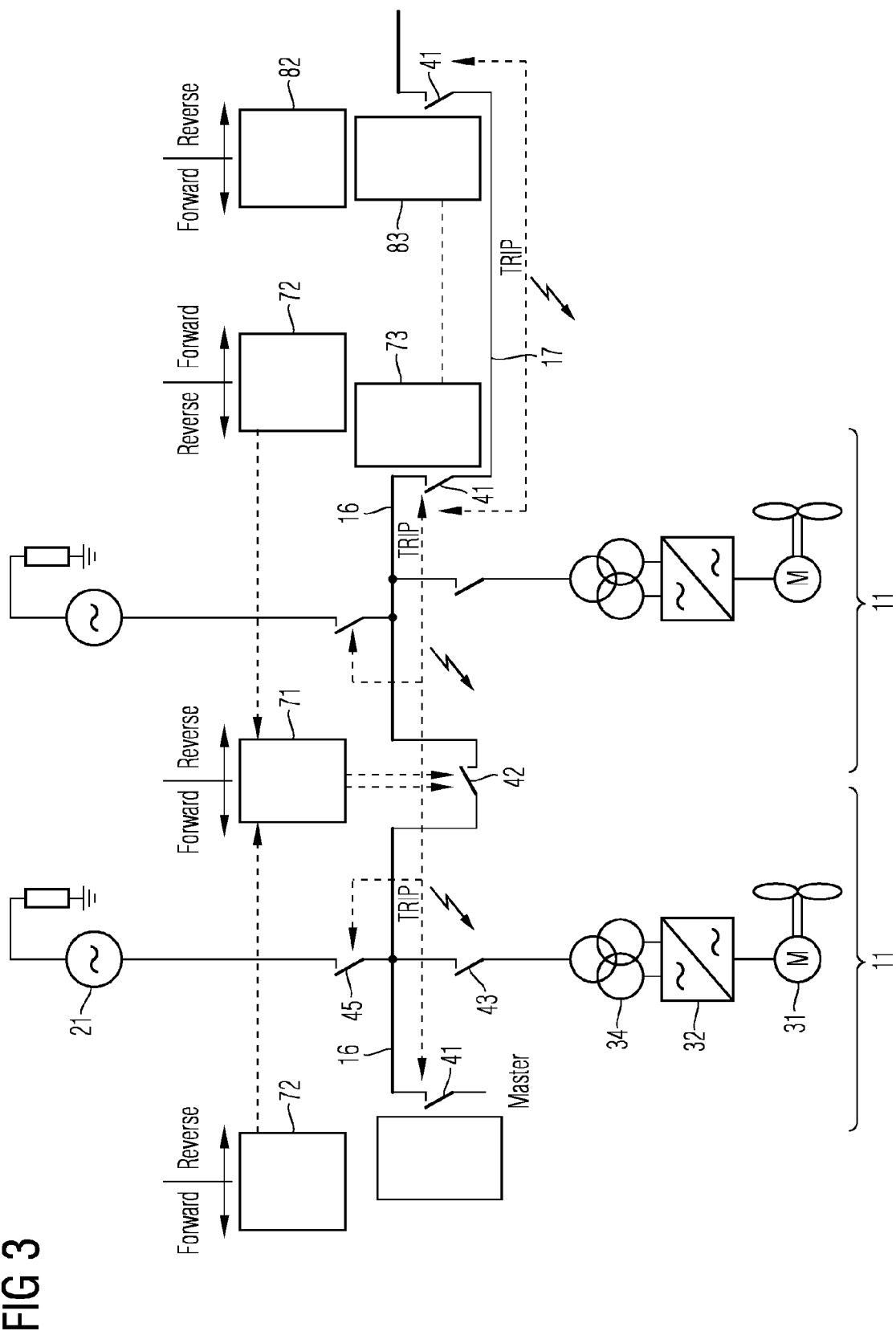
FIG. 3 is a schematic diagram showing the protection relays which operate associated circuit breakers for a section of the power system of FIG. 1
Figure 4:
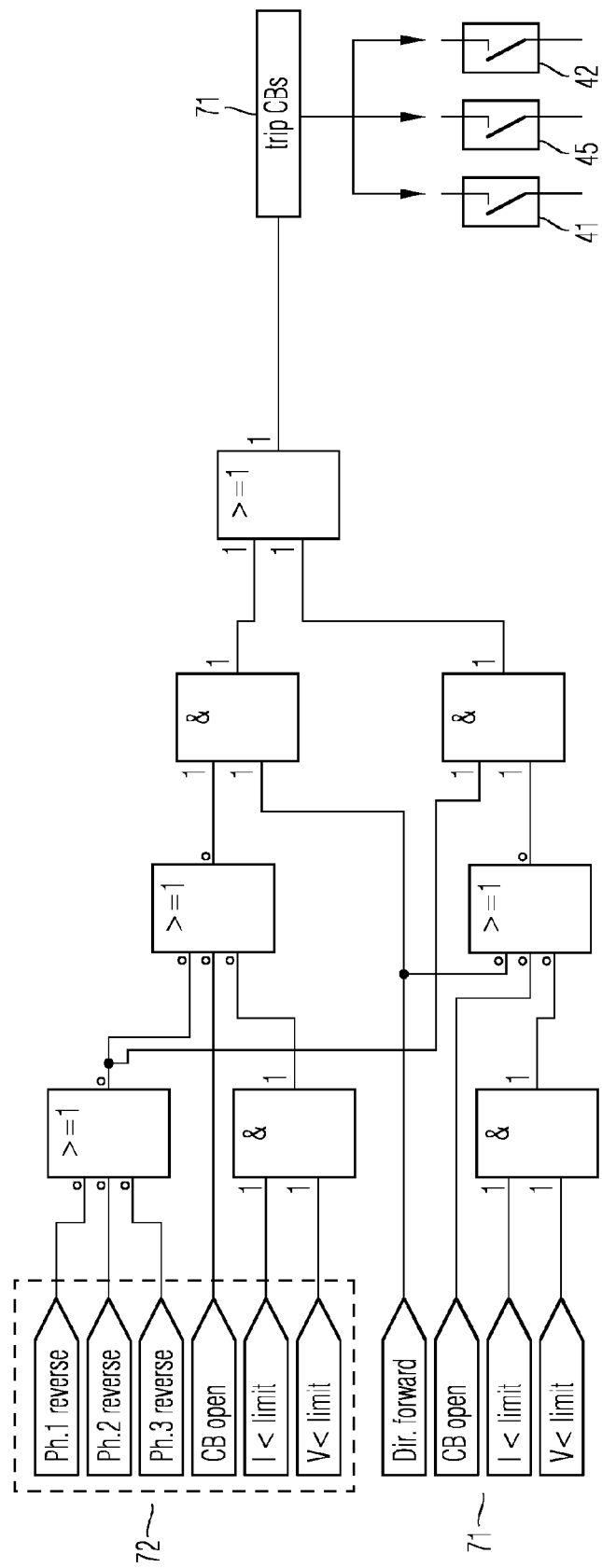
FIG. 4 is a flow diagram illustrating a logic for directional protection which may be implemented in the protection relays used with example embodiments.

An example of a possible implementation of the directional protection in the fault protection system is depicted in FIGS. 3 and 4. FIG. 3 shows only selected elements of the power system 10 of FIG. 1 for the purpose of a comprehensive presentation. The protection relay 71 associated with the bus coupler CB 42 is operating as a master relay. It communicates with the bus tie directional protection relays 72 on either end of the two bus subsections 16. Reference numeral 82 denotes a similar bus tie directional protection relay in a neighbouring power system section. For each directional protection relay 71, 72, 82, a reference current direction is shown (see arrows, forward or reverse). Besides being capable of detection the current direction, the protection relays are configured to detect the status of the circuit breaker they are connected to. Each relay is parameterized with the protection function parameters in accordance with the defined current directionalities of the particular power system setup and mode of operation. The master relay 71 comprises the directional protection trip logic for both the left and the right bus sections. The logic is configured to trip the bus tie CB 41, bus coupler CB 42 and the generator CB 45 upon occurrence of a fault in the respective bus subsection, and it may be configured to trip all CBs that are directly connected to the bus subsection at which the fault occurred.

Conditions at which the master relay 71 issues a trip command may include: all horizontal direction arrows from the measuring points (i.e. the relays with CTs) are pointing to the bus subsection (to the bus bar), or at one side of the bus subsection, the CB is open but the current direction (arrow) at the other side of the bus subsection is pointing towards the bus subsection, or if at one side of the bus subsection, the CB is de-energized (e.g. current I<10% and voltage V<20% of nominal values), but the current direction (arrow) at the other side of the bus subsection is pointing towards the bus subsection. In these cases, a fault at the bus subsection can be assumed (for fault downstream a feeder, see further below).

A respective logic is illustrated in FIG. 4 for the left hand bus subsection 16 of FIG. 3. The determinations in the upper part of the figure are made by the protection relay 72 (slave) and are communicated to the master protection relay 71, which makes the measurements in the lower part of the figure and implements the decision logic.

At relay 72, the current direction of the three phases are determined and reported if they are in reverse direction, i.e. pointing towards the bus subsection 16. It is also reported if the CB 41 is open or de-energized (I<limit and V<limit). At the relay 71, it is determined whether the current at the CB 42 is in forward direction (i.e. pointing towards the bus subsection), the status of the CB 42 and whether the CB is energized.

As can be seen from the flow diagram of FIG. 4, the above outlined conditions for issuing a trip signal are reflected in the logic of the protection relays. For example, if relay 72 reports one of the determined conditions (reverse current or CB open or de-energized) to relay 71, and relay 71 measures a current in forward direction, a trip signal is issued. Relay 71 issues the trip signal which results in the opening of CBs 41, 42 and 45. The trip signal is also illustrated in FIG. 3 with dashed arrows (for both bus subsections 16).

A similar logic is implemented in the protection relay 71 and the right hand protection relay 72 of FIG. 3 for the right hand bus subsection 16, although the first condition for the logic of relay 71 would now be a current in reverse (not forward) direction. The protection relays 71, 72 may for example be Siemens 7SJ64 relays, with relay 71 acting as a master and having directional protection logic for both adjacent bus subsections.

Protection relays 73 and 83 may for example implement the differential protection for the bus tie 17. The relays 73, 83 may for example be Siemens 7SD80 relays and may provide line differential protection phase (87L), 310 line differential protection (87 N L) and ground fault differential protection (87Ns L). As can be seen, a communication link is provided between the relays 73 and 83, and the relays 73 and 83 are coupled to the associated CBs 41 on the left and right hand side, respectively, of the bus tie 17 and can trip these CBs.

The protection logic for operating the bus tie CBs and the bus coupler CBs is also termed horizontal protection logic herein. Furthermore, directional protection may be provided in the fault protection system for further components of the power system, such as the bus ties and the bus coupler. It can be implemented as described above.

The protection relays associated with the feeder circuit breakers, e.g. the CBs 43, 44, 45, can be provided with a directional logic. In particular, they may have a different tripping behaviour in dependence on the direction of the current through the associated CB. If the current through the feeder (or the feeder CB) is in downstream direction, i.e. towards the load, the relay may cause the CB to trip within a first, shorter time t3 if the current is above the threshold. In this case, it can be assumed by the relay that the fault causing the overcurrent is downstream on the feeder side, so that tripping the CB should occur as fast as possible. A possible exception is described further above for e.g. the LV distribution feeder.

At the same time, the protection relay is configured to send a blocking signal to the protection relays coupled to the upstream CBs on the respective bus subsection, in particular to the protection relays of the bus tie CB 41, the bus coupler CB 42 and the generator CB 45. Although the differential protection for the bus subsection will not be triggered, since there is no fault on the bus subsection, the directional protection might trigger (e.g. since the current directions on either side of the bus subsection point towards the bus subsection). The blocking signal prevents the tripping of these CBs by their associated protection relays, since the fault can be isolated and cleared by tripping the feeder CB. Accordingly, the bus subsection and the further components coupled thereto can remain operational.

On the other hand, if the protection relay of the feeder CB detects a current over a defined threshold in reverse, upstream direction, i.e. in a direction towards the bus subsection 16, it trips the feeder CB within a longer time t4, with t4>t3. The purpose of this measure is that other protection functions obtain a chance to clear the fault, e.g. the generator protection. When the fault is cleared and the current returns to normal magnitude before the expiry of t4, the feeder CB will not trip, and the connected load remains operational. This can for example prevent loss of thruster drives, and accordingly, operational safety of the dynamically positioned vessel in increased. The protection relay does in this case not send a blocking signal to other relays, as the fault is located upstream and needs to be cleared by upstream CBs (or by another feeder CB).

The time t3 may for example lie within a range of about 50 ms to about 200 ms. The time t3 may lie within a range of about 200 ms to about 400 ms. It should be clear that these values can be chosen in accordance with the particular configuration of the power system 10 and of the fault protection system. Note that such directional protection functionality may also be included for other CBs of the fault protection system, e.g. for the bus tie CBs which may trip in t3 if a current above a threshold is flowing in a direction towards the bus tie, thus providing directional protection for the bus tie.

The fault protection system may furthermore comprise a breaker failure detection system. This system may be implemented for the CBs by means of the associated protection relays. The protection relay may monitor if the circuit breaker it is coupled to actually breaks the electric connection upon issuing of a trip command for this CB. A breaker failure may be determined by checking whether current is still flowing within the circuit in which the fault occurred, e.g. by checking if current is flowing across the circuit breaker. It is also possible to use a circuit breaker position indication to determine whether the circuit breaker opened.

If a circuit breaker failure is detected, the protection relay issues a trip command to the protection relays of adjacent CBs via respective communication links. As an example, if a failure of a feeder CB or a generator CB is detected, the associated protection relay may send a trip command to the protection relays of all circuit breakers directly connected to the respective bus subsection, so that all CBs in the bus subsection are opened. A propagation of the fault can thus be prevented. As a further example, if a failure of a bus tie or a bus coupler CB is detected, the associated protection relay may send a trip command to the protection relays of the next CB to the left and right side of the failed CB. In the example of FIG. 1, if a bus coupler CB 42 fails, a trip signal for the bus tie CBs of the adjacent bus subsections may be send. If a bus tie CB 41 fails, a trip signal for the further bus tie CB on the other end of the bus tie and a trip signal to the adjacent bus coupler CB may be send.

The tripping of the failure protection can be delayed, e.g. by a time t5. The time t5 may be a sum of the maximum CB operating time of the failed CB, the dropout time of the current flow monitoring element and a safety margin taking into consideration tolerances in these times. A premature tripping of the circuit breaker failure protection can thus be prevented.

As a further backup, a conventional short circuit and over-current protection, e.g. using definite time over-current curves, can be provided in the fault protection system. This back-up protection may for example be implemented for the bus tie CB 41, the bus coupler CB 42 and the generator CB 45. It may further be implemented for the bus subsection, i.e. CBs in the bus subsection may be opened if the current on the bus subsection exceeds a threshold value for a predetermined time.

The table 1 below summarizes a possible configuration of the fault protection system with the main protection functions and the backup protection functions for the respective components.

TABLE 1

Protection Functions

| Protection function | Differential Protection | Over-current | Breaker failure protection | Directional Protection |
|---|---|---|---|---|
| Generator 21 | MAIN | BACK-UP | BACK-UP Trip all CB in Sub-section | — |
| Bus-tie cables 17 | MAIN | BACK-UP | BACK-UP Relay trips Bus-tie CBs in both sections: master-slave | BACK-UP |
| Bus-coupler | MAIN | BACK-UP | BACK-UP If bus-coupler fails then relay trips next CB to the left side and one to the right side | BACK-UP |
| Distribution feeder 52 with transformer | — | MAIN | BACK-UP Trip all CBs in Sub-section | directional logic; upstream blocking if feeder fault |
| Thruster 30 feeder with transformer 34 | — | MAIN | BACK-UP Trip all CBs in Sub-section | directional logic; upstream blocking if feeder fault |
| $4^{th}$ winding 36 for auxiliary loads on thruster transformer 34 | — | MAIN | BACK-UP Trip all CBs in Sub-section | — |
| Drilling feeder 51 with transformer | — | MAIN | BACK-UP Trip all CBs in Sub-section | directional logic; upstream blocking if feeder fault |
| Sub-section 16 | MAIN | BACK-UP | BACK-UP Trip all CBs in Section | MAIN Directional logic: Trip unless feeder blocking received |

To make sure that the primary protection function trips first and that the system maintains the enhanced operability, i.e. to prevent unneccesarry tripping of components, Table 2 shows the tripping times (or delays) may be used for tripping the respective protection function:

TABLE 2

Protection Function timing

| Protection function | Differential Protection | Over-current | Breaker failure | Directional Protection | TIME CRITICALITY |
|---|---|---|---|---|---|
| Generator | <100 ms | 900 ms | 290 ms | — | High |
| Bus-tie cables | <100 ms | 740 ms | 290 ms | 290 ms (horizontal logic, no feeder blocking) | High |
| Distribution feeder transformer, I>> | — | 140 ms | 290 ms | 290 ms (horizontal logic, no feeder blocking) | High |
| Distribution feeder transformer, I> (1) | — | 440 ms | 590 ms | — | Lower |
| Thruster feeder with transformer | — | 140 ms | 290 ms | 290 ms (horizontal logic, no feeder blocking) | High |
| $4^{th}$ winding on thruster transformer (2) | — | 480 ms | 630 ms | — | Lower |
| Drilling feeder with transformer | — | 140 ms | 290 ms | 290 ms (horizontal logic, no feeder blocking) | High |
| Sub-section | <100 ms | — | Trip section in 140 ms + 150 ms = 290 ms | 140 ms (logic with feeder blocking) | High |

Regarding the row marked (1) of table 2, this denotes the above mentioned exception in which the tripping of downstream consumers is enabled by means of a delayed tripping time, so as to prevent the tripping of the whole LV distribution system. This is similar for row marked (2), for which a longer delay can be chosen to enable the tripping of downstream utilities/auxiliaries. The options can be chosen in accordance with the effect that a fault in one of these loads would have on the stability of the power system 10, i.e. if the stability would be compromised, the shorter tripping time or delay should be chosen.

FIG. 2 is a flow diagram giving a schematic and condensed overview of a method of operating a fault protection system according to an example embodiment. The method may be carried out on the powers system and fault protection system of FIGS. 1-4 and described hereinabove. Note that the steps described hereinabove can be part of the method, although they are not explicitly shown in FIG. 5.

In step 101, the power system 10 is operated in a DP3 mode of operation, with the bus tie breakers closed. Thus, it is sufficient to run two generators for the three power system sections 12, and since the generator can be operated in a more efficient regime, fuel consumption and $CO_2$ emission can be reduced.

In step 102, a fault occurs. The differential protection may be configured to react fastest (see table 2), so in step 103, it is checked if the differential protection picks up a fault. In the affirmative, the CBs in the respective protection zone are tripped (step 104). If not, the directional protection (step 105) or the over-current protection of the feeders (step 106) may pick up the fault. If the protection relay of a feeder CB detects a fault (i.e. by detecting a current over a defined threshold), the directional logic checks if the fault is downstream the feeder (step 107). In the affirmative, the feeder CB is tripped, e.g. in a time t3. Also, a blocking signal is send to the protection relays of the upstream CBs (step 109).

If the decision in step 107 is negative, i.e. if a reverse current through the feeder CB is detected, the feeder CB is not tripped immediately, but tripping is delayed to allow the tripping of another protection function, e.g. the directional protection in step 110. If the directional logic detects a fault (step 105), the respective protection relay, e.g. the master relay issues a trip command to trip the appropriate CBs according to the logic (step 110). If a blocking signal is received from a feeder protection relay, no tripping command is issued. The fault will thus be cleared either in step 108 or in step 110.

If the fault is still present after issuing the respective tripping command (step 111), the breaker failure protection will is carried out in step 112 with a certain delay, see table 2. As mentioned above, the breaker failure protection determines if a CB failed and issues a trip command to CBs on the left and right side of the failed CB, or to all CBs within the same bus subsection (step 113), see also the above description.

After the fault is cleared, operation continues with the remaining CBs closed (step 114). Using such procedure, most of the components that are not affected by the fault can stay connected to the power system 10 and remain operational. If a running generator was disconnected from the power system due to the fault, an additional generator may be started in step 115 (i.e. its associated prime mover, e.g. a gas turbine or diesel engine, is started).

It should be clear that the method may comprise further steps, e.g. the back-up overcurrent protection mentioned above and in table 1 or the like.

While specific embodiments are disclosed herein, various changes and modifications can be made without departing from the scope of the invention. The present embodiments are to be considered in all respects as illustrative and non restrictive, and all changes coming within the meaning and equivalency range of the appended claims are intended to be embraced therein.

What is claimed is:

1. A fault protection system of a power system of a dynamically positioned vessel, wherein the power system comprises a power distribution bus comprising three or more bus subsections, electric connections including bus ties which connect the bus subsections in a ring configuration and circuit breakers connected between the bus subsections to break the electric connections, wherein for at least one of said bus subsections, the fault protection system comprising:
    a generator circuit breaker for coupling a generator to the bus subsection,
    one or more feeder circuit breakers for coupling one or more loads to the bus subsection,
    a first circuit breaker via which a first end of the bus subsection is connected to a bus tie, said bus tie providing the electric connection to another bus subsection in said ring configuration, the first circuit breaker being a bus tie breaker,
    a second circuit breaker for coupling a second end of the bus subsection to a further bus subsection in said ring configuration,
    protection relays coupled to the circuit breakers for operating the circuit breakers,
    communication links between the protection relays, the protection relays being configured to exchange information via said communication links,
    wherein said protection relays are configured to provide at least:
        a generator protection zone including the generator circuit breaker and a generator, the protection relay coupled to the generator circuit breaker being configured to provide a differential protection for the generator,
        a bus tie protection zone including the bus tie breaker, the bus tie and a further bus tie breaker via which the bus tie is coupled to the other bus subsection, wherein protection relays coupled to the bus tie breakers are configured to provide differential protection for the bus tie, and
        a bus subsection protection zone including the bus subsection and the circuit breakers coupled to the bus subsection, the protection relays coupled to these circuit breakers being configured to provide a differential protection for the bus subsection.

2. The fault protection system of claim 1, wherein:
    the electric connection at the second end of the bus subsection is provided by a bus coupler, the second circuit breaker being a bus coupler circuit breaker, and
    said protection relays are further configured to provide a bus coupler protection zone including said bus coupler and said bus coupler circuit breaker, the protection relay coupled to the bus coupler circuit breaker being configured to provide a differential protection for the bus coupler.

3. The fault protection system of claim 1, wherein for providing said differential protection, the protection relays coupled to the circuit breakers in the respective protection zone are configured to:
    determine the currents entering and leaving the protection zone, and
    determine whether a fault exists in the protection zone based on the determined currents and/or on information received via a respective communication link.

4. The fault protection system of claim 1, wherein at least the protection relays coupled to the first circuit breaker and the second circuit breaker are configured to provide a directional protection for at least the bus tie and/or the bus subsection.

5. The fault protection system of claim 4, wherein the protection relays coupled to the generator circuit breaker, the first circuit breaker, and the second circuit breaker are configured to trip said circuit breakers if:

the current directions at the measuring points of these relays are pointing to the bus subsection, or the first circuit breaker or the second circuit breaker are open and the current direction at the respective other end of the bus subsection is pointing towards the bus subsection, or the current and voltage at the first circuit breaker or the second circuit breaker are below predetermined thresholds and the current direction at the respective other end of the bus subsection is pointing towards the bus subsection.

6. The fault protection system of claim 4, wherein:

the protection relays coupled to the one or more feeder circuit breakers provide a directional over-current protection, and if the protection relay detects a current above a threshold in the direction of the load, a blocking signal is provided to protection relays coupled to upstream circuit breakers to block these protection relays from tripping these circuit breakers and the respective feeder circuit breaker is tripped within a predetermined tripping time t3 after detection of a fault.

7. The fault protection system of claim 4, wherein the protection relays are configured to:

trip the circuit breakers coupled thereto within a first tripping time t1 after detection of a fault using said differential protection, and trip the circuit breakers coupled thereto within a second tripping time t2 after detection of a fault using said directional protection, wherein the first tripping time t1 is smaller than the second tripping time t2.

8. The fault protection system of claim 1, wherein:

the protection relays coupled to the one or more feeder circuit breakers provide an over-current protection, and the feeder circuit breaker is tripped if the respective protection relay detects a current in the feeder that is above a predetermined threshold.

9. The fault protection system of claim 8, wherein:

the protection relays coupled to the one or more feeder circuit breakers provide a directional over-current protection, if the protection relay detects a current above the threshold in the direction of the load, the respective feeder circuit breaker is tripped within a predetermined tripping time t3 after the detection of a fault, and if the protection relay detects a current above a further threshold in the reverse direction, the respective feeder circuit breaker is tripped within a predetermined tripping time t4 which is larger than the tripping time t3.

10. The fault protection system of claim 1, further comprising a breaker failure detection system which is configured to:

detect if a circuit breaker failed to break the electric connection after the relay coupled to the circuit breaker issued a trip command due to a fault, and in response to detecting such failure, trip one or more other circuit breakers to clear the fault.

11. The fault protection system of claim 10, wherein the breaker failure detection system is adapted to detect the failure of the circuit breaker by detecting a flow of current through the circuit breaker or by detecting the status of the circuit breaker.

12. The fault protection system of claim 10, wherein the breaker failure detection system is adapted to clear the fault:

if the first circuit breaker failed, by tripping a bus tie breaker on the other end of the bus tie, or if a bus coupler circuit breaker failed, by tripping a circuit breaker at the other end of each of the bus subsections connected to the bus coupler, or if the generator circuit breaker or a load circuit breaker failed, by tripping all other circuit breakers connected to the same bus subsection.

13. A power system of a dynamically positioned vessel, the power system comprising:

a power distribution bus comprising three or more bus subsections, electric connections including bus ties which connect the bus subsections in a ring configuration and circuit breakers connected between the bus subsections to break the electric connections; and a fault protection system comprising, for at least one of said bus subsections:

a generator circuit breaker for coupling a generator to the bus subsection, one or more feeder circuit breakers for coupling one or more loads to the bus subsection, a first circuit breaker via which a first end of the bus subsection is connected to a bus tie, said bus tie providing the electric connection to another bus subsection in said ring configuration, the first circuit breaker being a bus tie breaker, a second circuit breaker for coupling a second end of the bus subsection to a further bus subsection in said ring configuration, protection relays coupled to the circuit breakers for operating the circuit breakers, communication links between the protection relays, the protection relays being configured to exchange information via said communication links, wherein said protection relays are configured to provide at least:

a generator protection zone including the generator circuit breaker and a generator, the protection relay coupled to the generator circuit breaker being configured to provide a differential protection for the generator, a bus tie protection zone including the bus tie breaker, the bus tie and a further bus tie breaker via which the bus tie is coupled to the other bus subsection, wherein protection relays coupled to the bus tie breakers are configured to provide differential protection for the bus tie, and a bus subsection protection zone including the bus subsection and the circuit breakers coupled to the bus subsection, the protection relays coupled to these circuit breakers being configured to provide a differential protection for the bus subsection.

14. A method of operating a fault protection system of a dynamically positioned vessel power system having a power distribution bus comprising three or more bus subsections, electric connections including bus ties which connect the bus subsections in a ring configuration and circuit breakers connected between the bus subsections to break the electric connections, wherein the fault protection system comprises, for at least one of said bus subsections: a generator circuit breaker for coupling a generator to the bus subsection, one or more feeder circuit breakers for coupling one or more loads to the bus subsection; a first circuit breaker via which a first end of the bus subsection is connected to a bus tie, said bus tie providing the electric connection to another bus subsection in said ring configuration, the first circuit breaker being a bus tie breaker; a second circuit breaker for coupling a second end of the bus subsection to a further bus subsection in said ring configuration; protection relays coupled to the circuit breakers for operating the circuit breakers; and communication links between the protection relays, the protection relays being configured to exchange information via said communication links; wherein said protection relays are configured to provide at least: a generator protection zone including the generator circuit breaker and a generator, the protection relay coupled to the generator circuit breaker being configured to provide a differential protection for the generator; a bus tie protection zone including the bus tie breaker, the bus tie and a further bus tie breaker via which the bus tie is coupled to the other bus subsection, wherein protection relays coupled to the bus tie breakers are configured to provide differential protection for the bus tie; and a bus subsection protection zone including the bus subsection and the circuit breakers coupled to the bus subsection, the protection relays coupled to these circuit breakers being configured to provide a differential protection for the bus subsection,
- wherein the method comprises:
  - detecting the occurrence of a fault in one of said protection zones by means of the protection relays coupled to the circuit breakers comprised in the respective protection zone, and
  - tripping the circuit breakers in the protection zone in which the fault occurred.

15. The method according to claim 14, further comprising:
- if the fault was not cleared after a predetermined tripping time t1, using a directional logic provided in the protection relays to detect the presence of a fault in one of the electrical connections or in the bus subsection, and
- tripping the circuit breakers connected to said electrical connection or the bus subsection, respectively.

* * * * *